INVENTORS
PHILIPPE RENAULT
SIGISMOND FRANCKOWIAK

United States Patent Office 3,495,933
Patented Feb. 17, 1970

3,495,933
PURIFICATION OF GASES CONTAINING ACIDIC IMPURITIES
Philippe Renault, Neuilly-sur-Seine, and Sigismond Franckowiak, Montesson, France, assignors to Institut Francais du Petrole, des Carburants et Lubrifiants, Rueil-Malmaison, France
Filed Mar. 18, 1966, Ser. No. 535,594
Claims priority, application France, Mar. 18, 1965, 9,831; Sept. 1, 1965, 30,165; Dec. 28, 1965, 44,247
Int. Cl. B01d 53/14, 53/16, 57/00
U.S. Cl. 23—2
8 Claims

ABSTRACT OF THE DISCLOSURE

For the purification of gases containing hydrogen sulfide and hydrocarbons boiling higher than methane, a liquid phosphoric acid ester is employed as an absorbent to remove $H_2S$ and said hydrocarbon, and then solvent extracting the loaded phosphoric acid ester with an immiscible solvent selective for $H_2S$, e.g. aqueous inorganic basic solutions or aqueous glycolic solutions, and desorbing both the phosphoric acid ester and the resultant solvent to recover hydrocarbon and $H_2S$ gases in separate streams.

---

This invention relates to a process for the purification of gases containing acidic impurities, in particular sulfur-containing impurities, such as hydrogen sulfide and other organic or inorganic sulfides. Another aspect of this invention relates to simultaneous elimination of at least a portion of other impurities, such as carbon dioxides, as well as hydrocarbons having a boiling point higher than methane. Thus, this invention is particularly applicable to the purification of natural gas.

It is old to eliminate acidic impurities from a gaseous stream by a scrubbing operation wherein the selective absorbent is an aqueous and/or glycolic solution of amines or alkanolamines. This type of scrubbing operation is conducted at slightly elevated temperatures, for example, 20 50° C.; however, to regenerate the scrubbing solutions, it is generally necessary to heat them to a temperature higher than 100° C., for example 110–150° C. This type of process is widely used to eliminate carbon dioxide and/or hydrogen sulfide from various gaseous streams, such as natural gas, coke oven gas, water gas, refinery hydrogen gas, and so forth. Because of the relatively high temperatures required for regenerating the absorption solutions, such processes are relatively costly from the standpoint of heat consumption—particularly when the large volumes of treated gas are considered in industrial applications. In addition to this relatively high operating cost, such scrubbing operations are not always sufficiently selective for the separation of mercaptans. Still further, other acidic impurities can be so strongly attached to the amine that the regeneration of the amine solution requires severe regeneration temperatures.

In other known processes, there is interposed a step wherein the gas is washed with organic solvents. The gaseous impurities are dissolved by such solvents, and can be then desorbed therefrom by vacuum and/or heat. These processes, however, are deficient in that hydrocarbons other than methane cannot be simultaneously dissolved with the desired efficiency. Furthermore, certain of these solvents exhibit such an excessive affinity for water that they are not at all practical for the treatment of gaseous streams containing water vapor. The more water that is absorbed by the solvent, the lower the absorption capacity of the solvent for hydrocarbons having a boiling point higher than methane.

A principal object of this invention, therefore, is to provide an improved process for the elimination of acidic impurities from gaseous streams.

A partcular object is to provide a process wherein it is possible to separate acidic impurities, as well as hydrocarbons having a higher boiling point than methane in a single step.

An even more particular object of this invention is to provide a novel and improved process for the purification of natural gas.

Upon further study of the specification and appended claims, other objects and advantages of this invention will become apparent.

To attain the objectives of this invention, there is provided a process comprising the step of contacting the gas to be purified with a phosphoric acid ester in the liquid phase. This ester is preferably of the formula $$PO(OR)_3$$

wherein the R radicals being identical or different, represent monovalent hydrocarbon radicals, for example aryl, and in particular phenyl, or ortho-, meta-, or paratolyl, or alkyl, preferably methyl, ethyl, propyl, butyl, or hexyl, and also cycloalkyls, such as cyclohexyl.

The phosphoric acid ester advantageously contains 3–30 carbon atoms, preferably 6–18 carbon atoms, per molecule. It is also to be understood that this invention contemplates the utilization of either complete or partial esters of ortho phosphoric acid. For example those esters of the above formula wherein one R is a hydrogen atom could be used. Tetraesters of pyrophosphoric acid could also be used although they tend to be converted to corresponding diesters of orthophosphoric acid. For these reasons and to obtain a higher selectivity, it is preferred to use the esters of the above formula wherein the three R radicals are hydrocarbon radicals.

Preferred specific embodiments of the phosphoric acid esters of this invention include the following: tri-n-butyl orthophosphate, tricresyl orthophosphate, trimethyl orthophosphate, phenyl diethyl orthophosphate, dodecyl dimethyl orthophosphate, tri-n-propyl orthophosphate, tri-n-hexyl orthophosphate, cyclohexyl dimethyl orthophosphate, triisobutyl orthophosphate, and methyl di-n-butyl orthophosphate.

The most preferred ester is tri-n-butyl orthophosphate because its selectivity is particularly acute, and its solubility in water is relatively low, which facilitates washing operations.

Other less preferred compounds are diphenylorthophosphate, di-n-butylorthophosphate and tetra-n-butylpyrophosphate.

A particular advantage associated with the use of the phosphoric acid esters of this invention is that they are not deleteriously affected by other components that are usually found in impure gaseous streams. For example, no harm is done if the phosphoric acid ester contains a small quantity of water, up to water saturation therein. Likewise, the esters can be diluted with hydrocarbons, for example, $C_5$–$C_{20}$-hydrocarbons.

The particular types of gaseous streams which are most efficiently treated by the process of this invention analyzes as follows:

|  | Percent by volume |
|---|---|
| Methane | 50–95 |
| Hydrogen sulfide | 1–25 |
| Ethane and higher hydrocarbons | 1–25 |
| Other gases such as steam, nitrogen, $CO_2$, mercaptans, carbon monoxide, hydrogen, carbon oxysulfide | 0–40 |

The step of scrubbing the gaseous stream with the phosphoric acid ester is conducted at superatmospheric pressures generally about 10 to 200 atmospheres absolute, preferably 20 to 100 atmospheres. The preferred temperature range is $-20-+60°$ C., more preferably 10–30° C.

With respect to removing $H_2S$, in particular, it is advantageous to use 0.01–20 mols, preferably 0.1–5 mols, of the phosphoric acid ester to extract 1 mole of $H_2S$ from the gas. It is to be understood, however, that the preceding values are not to be considered as limitative of the invention in its broad aspects.

The resultant gas is at least partially depleted in acidic impurities as well as hydrocarbons having a boiling point higher than methane. Furthermore, where the solvent is anhydrous, the rseultatnt gas can also be dehydrated to a certain extent.

In additon to treating the raw gas with the phosphoric acid esters, additional scrubbing steps of the conventional type can be optionally employed. For example, a supplementary treatment comprises contacting the gas with a solution of an amine, an alkanolamine, or mineral base in water and/or in organic solvents, as, for example, a glycol. If this organic solvent is anhydrous, the resultant gas also is dehydrated.

When a supplementary treatment is used, the amount of amine, alkanolamine or mineral base is considerably reduced with respect to the amount required when these agents are used alone.

As dehydrating solvents, the following may be named: trimethylphosphate, glycerine, glycol, diethyleneglycol and triethyleneglycol.

For a discussion of known dehydrating solvents reference is made to "Gas Purification" by Arthur L. Kohl and Fred C. Riesenfeld, McGraw-Hill Book Company, 1960, in particular pages 343–369.

When a supplementary absorption step is utilized, it is unnecessary to maintain two separate and distinct absorption zones. Instead, the gas can be simply circulated countercurrently to, for example, both an amine solution and a phosphoric acid ester solution by passing the gas into the bottom of an absorption column and introducing the amine solution to the top of said column and the phosphoric acid ester solution to an intermediate zone in said column. Alternatively, in a mixer-settler type apparatus, a mixture can be previously made of an amine solution and phosphoric acid ester solution which is then introduced into the mixer, or the two solutions can be introduced at the same level in such an apparatus, or even in a column. Thus, it is clear that there is a substantial flexibility in the specific embodiment of this invention wherein two absorption liquids are employed. It is further to be understood that, in the preceding description, the term "amine" is intended to cover both simple amines and alkanolamines.

When a mixture of the phosphoric acid ester and amine solution is withdrawn from the absorption zone, such a mixture can be separated into two liquid phase by simple decantation. The ester can then be regenerated as indicated hereafter, and the amine solution can be regenerated by heat in a conventional manner. The regenerated liquid phases are then recycled to the absorption apparatus. With respect to the type of amine or alkanolamine that can be employed in this invention, a wide variety can be selected from prior art disclosures. Preferred specific amines include mono-, di-, and triethanolamines, as well as the corresponding propanolamines, diisobutylamine, diisopropylamine, and triethylamine. For a further disclosure of various possible amines, attention is directed to Kohl and Riesenfeld's book supra, in particular pages 18–86.

Instead of amines, other absorbing agents can be used such as described in the above book, pages 87–196.

As for the acidic gaseous impurities and hydrocarbons having a boiling point higher than methane which are dissolved by the phosphoric acid ester of this invention, it is, of course, to be understood that such gases, upon regeneration of the phosphoric acid ester, can be further separated into useful products of commerce.

In view of the preceding description, it is believed that one skilled in the art can utilize this invention without further instruction. For purposes of illustration, however, the following represents specific preferred embodiments of the present invention, referring in detail to the attached drawings wherein.

Figure 1:
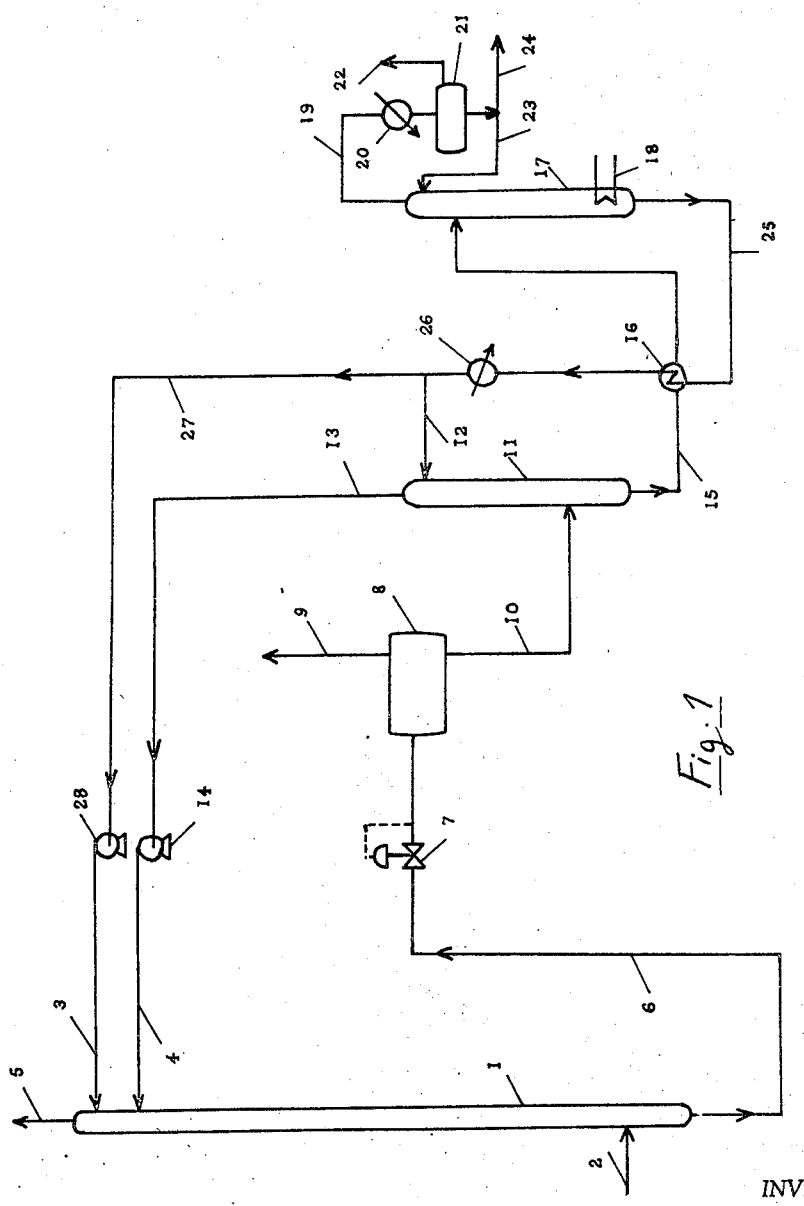
FIGURE 1 is a schematic flowsheet wherein the absorption solution is regenerated by pressure release and/or heat, or by entrainment of the volatile compounds by a carrier gas, such as air, nitrogen, or steam.

Referring now to FIGURE 1 in greater detail, raw gas is passed through conduit 2 into the bottom portion of absorption column 1. This raw gas is a natural gas composed of 75% by volume of hydrocarbons (essentially methane, with small quantities of heavier hydrocarbons and traces of gasoline fractions), 15% $H_2S$, and 10% $CO_2$. This gas is passed countercurrently to two liquid phases admitted through conduits 3 and 4, respectively. The resultant gas substantially to completely devoid of $CO_2$ and $H_2S$ is then withdrawn through conduit 5 at the top of the column.

The liquid phase passed into conduit 3 comprises the following:

|  | Percent by weight |
|---|---|
| Diethanolamine | 20 |
| Ethyleneglycol | 70 |
| Water | 10 |

The liquid phase in conduit 4 consists essentially of tri-n-butyl phosphate. For each cubic meter of raw gas, measured at 0° C. and 1 atm. absolute, there are employed 0.3 liter of solution in conduit 3 and 3 liters of tri-n-butyl phosphate in conduit 4.

The absorption operation is conducted at about 20° C. and a pressure of about 70 kg./cm.² The loaded liquid phases are withdrawn through pipe 6 at the bottom of column 1. This mixture is then passed through pressure reducing valve 7 to phase separator 8 operating at about 1.5 kg./cm.² From phase separator 8, there was withdrawn in conduit 9 an overhead gas consisting essentially of $H_2S$, $CO_2$, and small quantities of hydrocarbons having a boiling point higher than methane.

The resultant liquid phases from phase separator 8 are withdrawn through conduit 10 and introduced into column 11 functioning as a decanting apparatus. The lighter phase which is essentially tributyl phosphate, rises in column 11, and in doing so is scrubbed by a portion of regenerated solution of ethanolamine which is admitted through conduit 12 into the top of column 11. The resultant lighter phase is then recycled through conduit 13 through pump 14 into conduit 4. From the bottom of column 11, the heavier solution of alkanolamine is withdrawn through conduit 15, heated in heat exchanger 16, and passed to regenerating column 17. The temperature in the regenerating column is maintained at about 135° C. The necessary heat for column 17 is supplied by heating coil 18 at the bottom of the column.

At the top of regenerating column 17, there are withdrawn gas and vapors which are passed through conduit 19, condenser 20, and then into phase separator 21. From this phase separator, gas consisting essentially of $CO_2$ and $H_2S$ is withdrawn through conduit 22, whereas the liquid which is essentially water is recycled through conduit 23. A part of this recycled water can be withdrawn through conduit 24, particularly when the raw gas contains substantial quantities of water.

The regenerated solution of alkanolamine is withdrawn from the bottom of regenerating column 17 through conduit 25, is passed through heat exchanger 16, and supplementary cooler 26. About 20 to 80%, preferably about half, of the solution is recycled through conduit 12, whereas the remainder is sent through conduit 27, via pump 28, into conduit 3. The above-described system facilitates the separation of condensible hydrocarbons.

In order to effect the removal of low-boiling constituents from the liquid in conduit 13, said liquid is subjected, in whole or in part, to a heating step optionally conducted under vacuum. This can be accomplished in an evaporator or in a distillation column. Upon condensation of the overhead vapor, the gasoline-type hydrocarbons are recovered; whereas the bottoms liquid phase depleted of the hydrocarbons will be recycled through pump 14 into column 1. In practice, it is sufficient to subject only about 5–25% of the liquid in conduit 13 to such a treatment, the remaining liquid being recycled directly to column 1.

Figure 2:
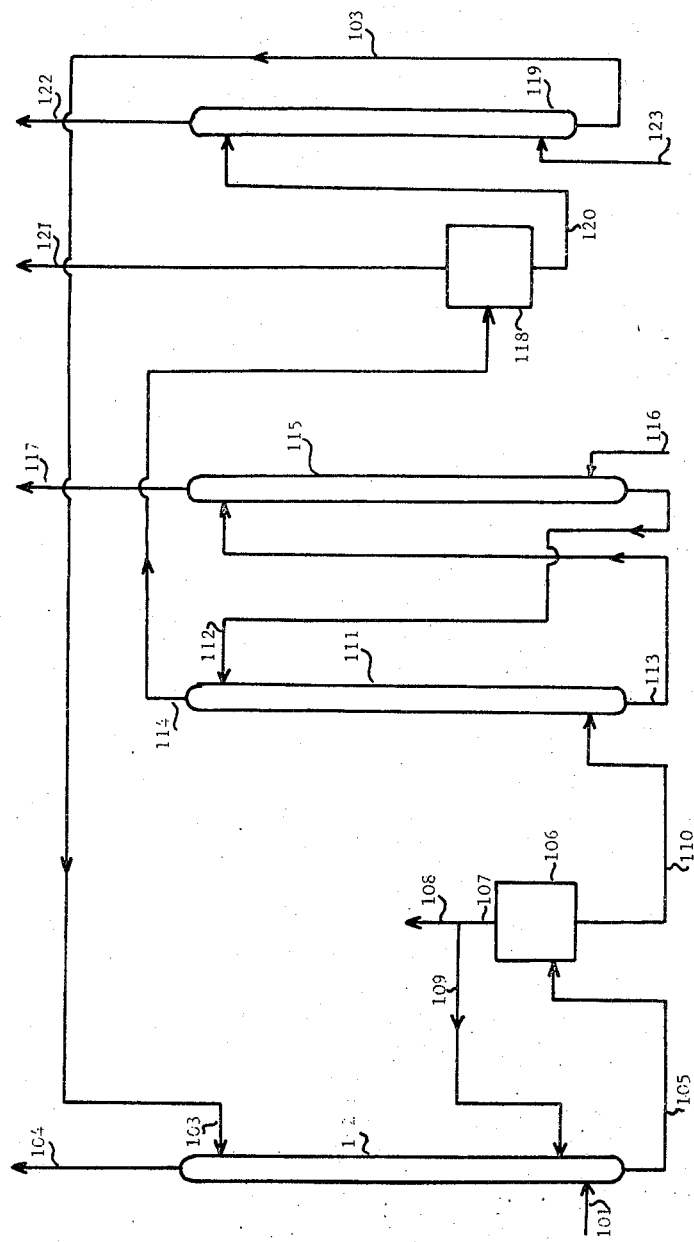
FIGURE 2 is also a schematic flowsheet which shows the utilization of an auxiliary agent, such as water, glycol, alkanolamine, amine, a mineral base, or mixture thereof. This mode of operation can also be optionally combined with the system shown in FIGURE 1.

Referring now to FIGURE 2, the auxiliary solvent solution is subjected to a fractionation to remove the gaseous contaminants from the liquid. This fractionation can be conducted by a lowering of the pressure of the liquid, heating, and/or by entrainment, using an inert and substantially insoluble carrier gas. The latter mode of operation serves to reduce the solubility of the acidic gases in the third solvent.

Re-extraction can be preceded by one or more pressure-reducing steps in order to remove entrained light hydrocarbons.

In the process illustrated by FIGURE 2, the raw gas is a natural gas containing methane, carbon dioxide, and/or hydrogen sulfide, as well as heavy hydrocarbons, such as ethane, propane, butane, and gasoline. The gas can also contain other impurities.

The gas is admitted under pressure through conduit 101 into absorption column 102. The liquid phosphoric acid ester is introduced through conduit 103 into the top of column 102, which column is maintained at an elevated pressure and a slightly elevated temperature, more specifically 10 to 30° C. and 20–100 atmospheres absolute. Such conditions favor the absorption of the acidic gases ($CO_2$ and $H_2S$) and hydrocarbons having a boiling point higher than methane in the phosphoric acid ester.

The gas is purified by traversing column 102, and is removed therefrom through conduit 104, and if desirable, it can be subjected to a supplementary treatment with amines, alkanolamines, or mineral bases. In the case of natural gas, the purified gas is found to be enriched in methane.

The phosphoric acid ester is removed via conduit 105 from the bottom of column 102 and is subjected to a pressure-reducing step in phase separator 106 (several serially connected phase separating steps can also be used if desirable). The pressure-reducing step can be optionally replaced by a heating step, or the two techniques of heating and pressure reduction can be co-operatively employed. From phase separator 106, gas is liberated via conduit 107. This gas can be completely sent to waste, because of its high content of acidic gases, particularly $CO_2$, and in this case would be passed out of the system through a line 108. Alternatively, the gas leaving phase separator 106 can be used for purposes of combustion in some cases, and if so, is recycled via line 109 to column 102 in order to recover residual methane. Optionally, before being recycled to column 102, the gas can be subjected to a washing step with an amine or can be re-extracted with phosphoric acid ester.

The phosphoric acid ester withdrawn via conduit 110 from phase separator 106 is then subjected to a re-extraction step, preferably in a countercurrent manner, by an auxiliary solvent exhibiting a high dissolving capacity for impure acids and very low dissolving capacity for phosphoric acid ester. In this manner, it is possible to maintain two liquid phases in solvent extraction unit 111. This auxiliary or third solvent, when heavier than the phosphoric acid ester, is passed through conduit 112 and removed through conduit 113, whereas the ester is removed at the top of the extraction column through conduit 114. If the ester is heavier than the solvent, then the entering and withdrawal lines are changed accordingly.

As the third solvent, water or an aqueous glycol solution is employed. Such aqueous glycol mixtures advantageously contain up to 80, preferably 20–60, parts by weight of glycol per 100 parts by weight of the mixture. In any event, whether ordinary water is used or a water-glycol mixture, it is preferable to employ a ratio of about 0.5–10, most preferably 2–5, parts by volume of the third solvent per 1 part by volume of the phosphoric acid ester.

It is also possible to employ as the auxiliary solvent a solution of an amine or an alkanolamine, for example, in water and/or a glycol.

The solvent extraction unit 111 is advantageously maintained at those temperatures and pressures wherein maximum extraction is obtained, for example 10 to 200 atmospheres and −20 to 60° C.

When phase separator 106 is operated under a pressure lower than the pressure prevailing in extraction column 102, it is preferred to operate the solvent extraction column 111 under a pressure which is close to that being employed in the phase separator. Such preferred pressures, under such circumstances, are 10–60 atmospheres.

According to another aspect of this invention, it is possible to operate extraction column 111 under a pressure which is substantially lower than the pressure in separator 106 and in column 102.

In this way, a gas-liquid mixture is obtained which is lowered in unit 111 in its content of acidic gases.

The loaded third solvent leaving the bottom of solvent extraction column 111 via conduit 113 is passed to desorption column 115 wherein it is depleted in the dissolved acidic gases. The resultant third solvent is then recycled via conduit 112 to the solvent extraction column.

The gas-liquid fractionation step which is conducted in colum 115 is accomplished by conventional means, such as heating, pressure reduction, and/or entrainment by an inert gas. In practice, it is preferred to employ a reduced pressure on the order of 1–5 kg./cm.$^2$, accompanied by the intoduction of air through conduit 116, whereby the liquid is scavenged of residual impurities. The stream containing the gaseous impurities is then removed via line 117.

It is also possible to employ several different successive systems functioning according to the precedingly described principles, for example pressure-reducing step followed by an entrainment step by an inert gas, such as air.

The phosphoric acid ester containing dissolved hydrocarbons is passed from the solvent extraction unit to line 114 into one or more gas-liquid fractionating units based on the use of heat, low pressures and/or entrainment by an inert gas, such as air, nitrogen, or steam. For example, in FIGURE 2, the liquid in line 114 is passed to a reduced-pressure phase separator 118, followed by passing the resultant liquid from the phase separator through conduit 120 into a colum based on the use of steam as an entraining agent (similar to a steam distillation unit), this column being designated 119 in FIGURE 2. Effluent gas in line 121 is withdrawn from phase separator 118 and contains the lighter hydrocarbons extracted from the phosphoric acid ester. The heavier hydrocarbons are entrained by the steam in column 119, and are removed as overhead vapor in line 122, in admixture with steam that was introduced through line 123 into the bottom of column 119. As an example of the precedingly described difference in the separation of lighter and heavier hydrocarbons, it is possible to remove propane and butanes through line 121 and gasolines through line 122. In such a case, it is advantageous to reheat the phosphoric acid ester to a temperature of about 100–150° C.

The hydrocarbons removed from line 121 and/or line 122 can be further purified, for example, by washing same with alkanolamines. The regenerated phosphoric acid ester is then passed from the bottom of column 119 to line 103 to absorption column 102.

A modification of the system shown in FIGURE 2 includes an intermediate washing step between column 111 and phase separator 118. Such a washing step, for example, with an alkanolamine, would be highly advantageous in such cases where the solvent extraction step in column 111 does not yield the desired efficiencies with respect to eliminating the acidic gaseous impurities from the phosphoric acid ester. In view of the fact that such an additional washing step would merely be supplementary, it would be possible to use relatively small equipment and reduced quantities of alkanolamine.

According to still another modification, only a portion of the phosphoric acid ester is treated in phase separator 118 and/or column 119, the remaining portion being recycled directly to absorption column 102. In this case, it is preferred to introduce a completely purified ester to the top of the absorption column, and to introduce the partially purified ester into an intermediate zone in the column. FIGURE 2 will now be described by a specific example, it being recognized, however, that this example is not to be considered as limitative of the invention in any way whatsoever. All amounts are given per unit of time; the raw gas contains saturated hydrocarbons $C_1$–$C_8$ and acidic components, as follows:

| | Mols |
|---|---|
| $H_2S$ | 6.78 |
| $CO_2$ | 4.28 |
| Methane | 31.60 |
| Ethane | 1.27 |
| Propane | 0.39 |
| Butane | 0.23 |
| $C_5$–$C_8$ | 0.08 |

The absorption step is conducted at 25° C. under 70 atmospheres.

There is employed 15.3 mols of tributyl orthophosphate as the absorption medium to treat the raw gas. By virtue of this absorption step, a purified gas is obtained having the following composition:

| | Mols |
|---|---|
| $H_2S$ | 0.001 |
| $CO_2$ | 0.830 |
| Methane | 29.930 |
| Ethane | 0.170 |
| $C_3$ and above | 0.006 |

If desired, the above-described purified gas can be even further purified by subjecting it to a supplemental absorption step based on the use of an amine or an ethanolamine to eliminate carbon dioxide and traces of hydrogen sulfide without, at the same time, affecting the content of hydrocarbon.

The solvent extraction step is conducted at 25° C. under 35 atmospheres with an aqueous solution of glycol (formed by equal parts by weight of water and glycol), the quantity of the solution being 459 mols. The aqueous solution is denuded of dissolved gas by reducing the pressure to about 3 atmospheres at the ambient temperature, combined with entrainment by a current of air.

The tributyl phosphate withdrawn from the solvent extraction unit still contains 1.76 mols of $H_2S$ and 0.46 mol of $CO_2$, as well as some hydrocarbons. This stream is then subjected to a washing step with a solution of an alkanolamine in order to completely remove the acidic impurities. The tributyl phosphate is finally subjected to a series of pressure-reducing steps at progressively increasing temperatures, to final conditions of 120° C. and 1 atmosphere absolute. There are thus recovered hydrocarbon fractions having progressively increasing boiling points, as follows:

| | Mols |
|---|---|
| Ethane | 1.09 |
| Propane | 0.38 |
| Butane | 0.23 |
| Hydrocarbons $C_5$–$C_8$ | 0.08 |

Whereas the preceding examples represent preferred embodiments of this invention, it is nevertheless to be understood that these examples can be repeated while employing the various modifications described in the preceding description of the invention, without at the same time varying from the essence of the invention. For example, tri-n-butyl phosphate can be replaced by the numerous other phosphoric acid esters generically and specifically mentioned herein to obtain substantially equivalent results. Of course, it is to be recognized that for each particular solvent that is employed, there are different optimum operating conditions. For example, to obtain the above-described results with trimethyl phosphate, it is advisable to use one-third less of such ester as compared with tri-n-butyl phosphate. Furthermore, with the trimethyl phosphate, it is preferred to employ the first-described fractionating technique, using reduced pressures and/or heat. In contrast, when using tricresyl phosphate, the volume of the absorption medium should be increased by about 50% to obtain the best results.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims. In such claims, the expression "amine" is used generically to include all types of amines, including alkanolamines.

What is claimed is:

1. A process for the purification of gases containing hydrogen sulfide and at least one hydrocarbon having a boiling point higher than methane as impurities, said process comprising the steps of contacting the gas to be purified with a liquid phosphoric acid ester wherein said $H_2S$ and said higher boiling hydrocarbon are absorbed to obtain a purified gas containing a lower quantity of said impurities, extracting the resultant phosphoric acid ester solution containing $H_2S$ and higher boiling hydrocarbon with a solvent substantially immiscible with said phosphoric acid ester and selected from the group consisting of water, aqueous amine solutions, aqueous glycolic solutions and mixtures thereof, whereby $H_2S$ is selectively dissolved in said solvent, desorbing the resultant phosphoric acid ester solution to recover said higher boiling hydrocarbon and desorbing the resultant solvent to recover $H_2S$ therefrom.

2. A process according to claim 1, wherein said liquid phosphoric acid ester is selected from the group consisting of tributylphosphate, tricresylphosphate, trimethylphosphate, phenyl diethylphosphate, dodecyl dimethylphosphate, tripropylphosphate, trihexylphosphate, cyclohexyl dimethyl phosphate, triisobutylphosphate and dibutyl phosphoric acid.

3. A process according to claim 1, wherein said contact between said gas and said liquid phosphoric acid ester is carried out at 10–200 atmospheres.

4. A process according to claim 1, wherein the resultant phosphoric acid ester solution containing $H_2S$ and higher boiling hydrocarbon is subjected to a pressure release before being contacted with the solvent.

5. A process according to claim 3, wherein desorbing of the resultant phosphoric acid ester solution is carried out by pressure reduction.

6. A process according to claim 5, wherein the gas to be purified contains at least two hydrocarbons having a boiling point heavier than methane, the desorbing being carried out in at least two serially connected steps, while at least two hydrocarbons are separately recovered.

7. A process according to claim 1, wherein desorbing of the resultant solvent is carried out by pressure reduction.

8. A process according to claim 1, wherein the purified gas is further contacted with an amine to remove an additional quantity of hydrogen sulfide from said gas.

References Cited

UNITED STATES PATENTS

| 1,946,489 | 2/1934 | De Jahn | 23—3 X |
| 2,383,416 | 8/1945 | Reed | 23—181 X |
| 2,623,611 | 12/1952 | Levine et al. | 55—64 |
| 2,781,863 | 2/1957 | Bloch et al. | 55—73 X |
| 2,975,026 | 3/1961 | Mills | 23—3 |
| 3,334,469 | 8/1967 | Deicher et al. | 55—73 |

OSCAR R. VERTIZ, Primary Examiner

E. C. THOMAS, Assistant Examiner

U.S. Cl. X.R.

23—181, 312; 55—73; 260—666